March 27, 1962 J. D. GATTI 3,026,822
APPARATUS FOR MAKING A FILLING CONTAINING PASTRY
Filed April 15, 1960 2 Sheets-Sheet 1
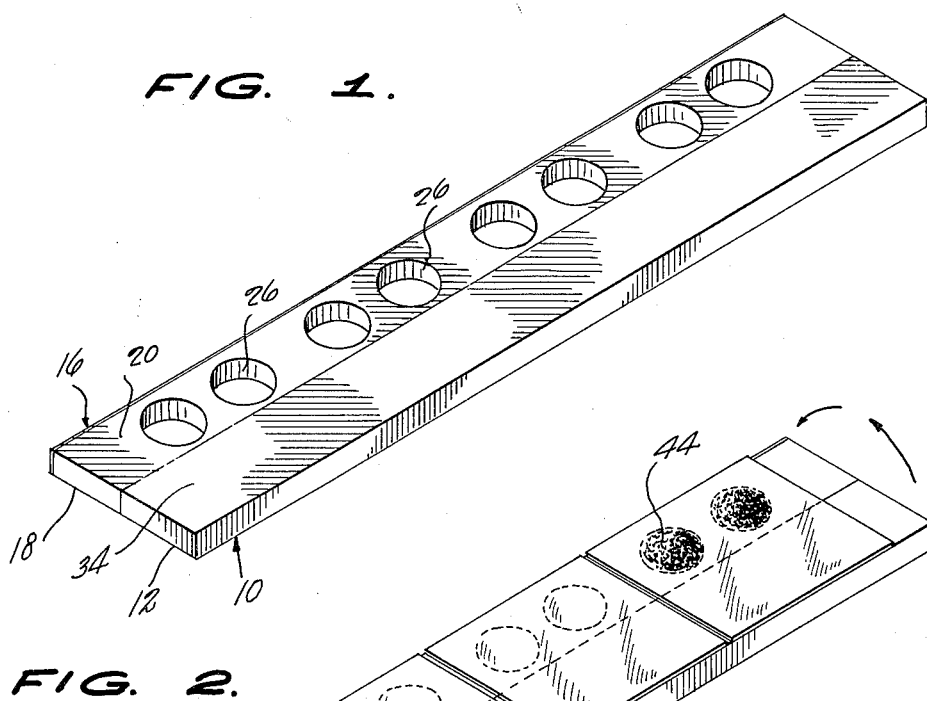
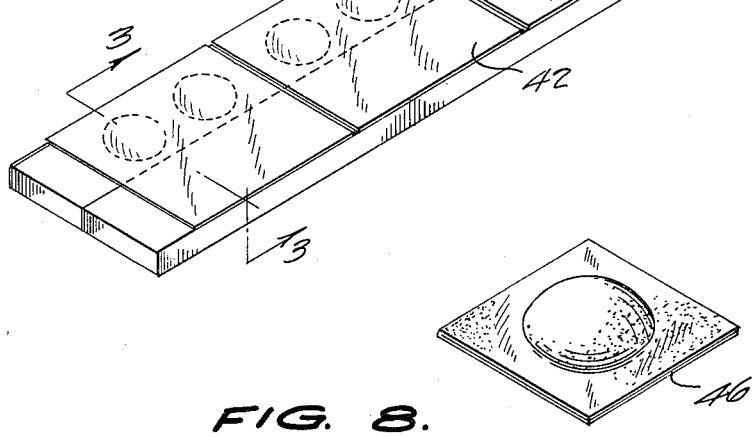
INVENTOR.
JOSEPH D. GATTI,
BY
McMorrow, Berman & Davidson
ATTORNEYS.

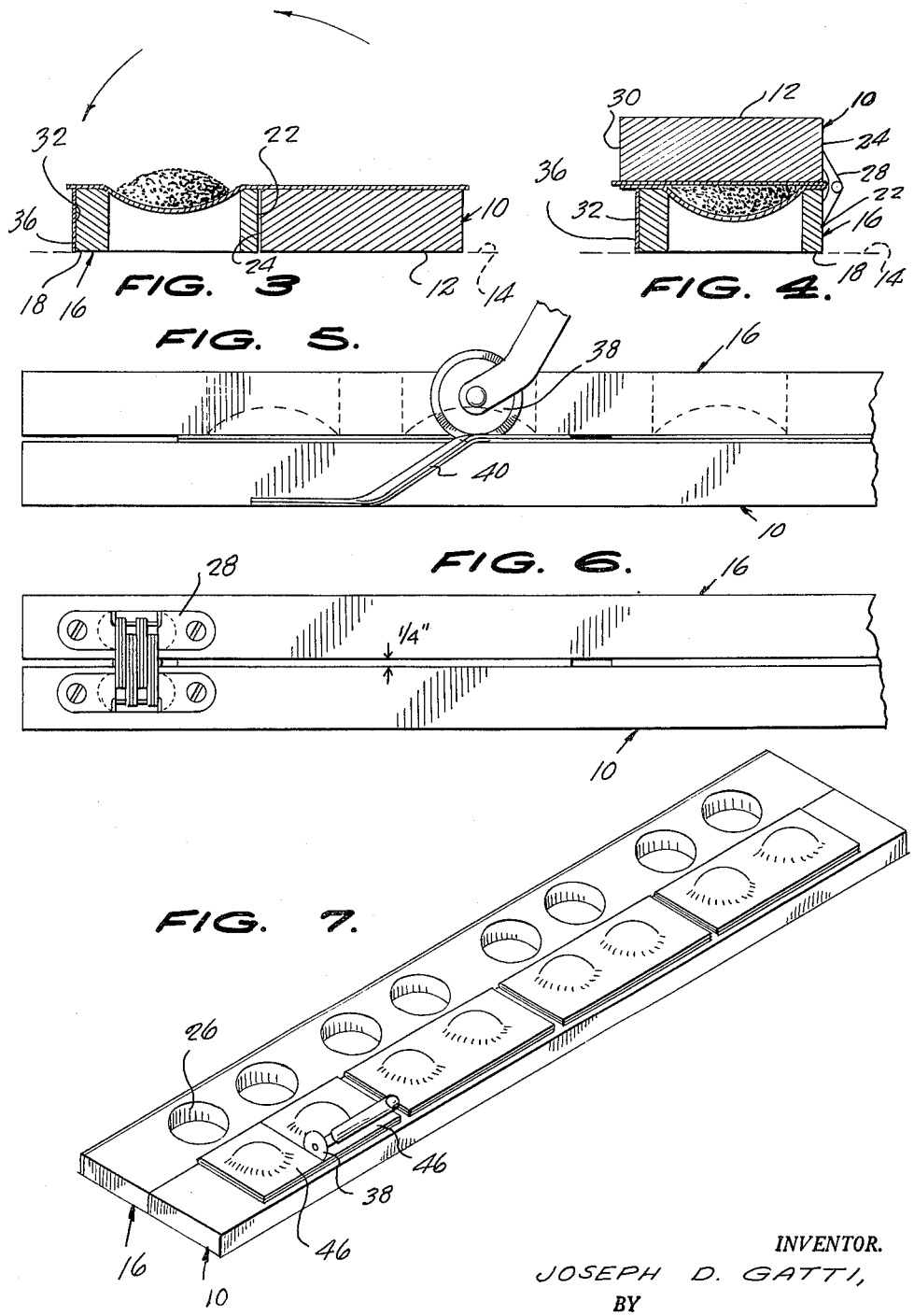

United States Patent Office 3,026,822
Patented Mar. 27, 1962

3,026,822
APPARATUS FOR MAKING A FILLING
CONTAINING PASTRY
Joseph D. Gatti, 4200 16th St. NW., Washington, D.C.
Filed Apr. 15, 1960, Ser. No. 22,513
1 Claim. (Cl. 107—19)

The present invention relates to kitchen utensils generally and in particular to an apparatus for making a filling containing pastry.

In the making of a filling containing pastry, such as ravioli or the like, it is most desirable that the pastries produced all have approximately the same amount of filling surrounded by borders of pastry of substantially the same size and configuration. This is of especial importance when the ravioli or other filled dough or pastry article is produced for sale in a restaurant, bakery, or the like. Many devices to accomplish the forming and filling of a pastry have been proposed in the past but few of such devices have met with more than limited success for various reasons. A chief reason for the non-acceptance of the devices proposed has been that the devices are complicated to manufacture and assemble and are of such cost for the purpose intended that most of the ravioli or other filled pastry is produced by hand without the use of any machine or device.

An object of the present invention is to provide an apparatus for making a filling containing pastry such as ravioli or the like, which lends itself to ease of making filling containing pastries in quantity and in an efficient manner.

Another object of the present invention is to provide an apparatus for making a filling containing pastry which is simple in structure, one readily manufactured and assembled, and one which is economically feasible.

A further object of the present invention is to provide an apparatus for making a filling containing pastry which lends itself to ready cleaning and sterilization if desired, one which requires no skilled help to use when making ravioli or the like, and one which may be manufactured in any convenient size for making any number of pieces of ravioli desired.

These and other objects and advantages of the present invention will be fully apparent from the following description when taken in conjunction with the annexed drawings, in which:

FIGURE 1 is an isometric view of the apparatus of the present invention, shown in open position;

FIGURE 2 is an isometric view of the assembly shown in FIGURE 1 with sheets of pastry resting on the upper faces of the sections of the apparatus, one sheet of pastry having filling placed thereon;

FIGURE 3 is a view taken on the line 3—3 of FIGURE 2, on an enlarged scale;

FIGURE 4 is a view of the assembly in FIGURE 3, shown in closed position;

FIGURE 5 is a fragmentary side elevational view showing the use of a circular knife to trim an edge portion of the pastry;

FIGURE 6 is a fragmentary elevational view of the hinge side of the apparatus, a portion being broken away;

FIGURE 7 is an isometric view showing the apparatus in open condition and showing the use of the circular knife to separate formed sections of ravioli from each other; and FIGURE 8 is an isometric view of the formed filling containing pastry as produced by the apparatus of the present invention.

Referring in greater detail to the drawings, in which like numerals indicate like parts throughout the several views, the apparatus for making filling containing pastry comprises a first rigid flat faced board 10 positioned so that the lower face 12 rests upon and is supported upon a horizontal flat supporting surface such as a table or the like, such supporting surface being designated in FIGURES 3 and 4 by the numeral 14.

A second rigid flat faced board 16 has one face 18 resting upon the surface 14 and the other face 20 uppermost. The board 16 is positioned so that its one side edge 22 abuts and extends along the side edge 24 of the board 10. The face 20 of the board 16 is provided with a plurality of holes 26 extending in a row along the face 20 from one end to the other end of the board 16.

Hinge means, as at 28 in FIGURE 6, connects the side edge 22 of the board 16 to the side edge 24 of the board 10 for movement of either one of the boards 10 and 16 from the side edge abutting position to a position overlying and resting upon the other board with the side edges 22 and 24 spaced from each other, at least a quarter inch apart, as indicated by arrows in FIGURE 6.

The portion adjacent the side edge 30 of the board 10 overhangs and contacts the side edge 32 of the board 16 when the boards 10 and 16 have their uppermost faces 20 and 34 in face to face relation, as in FIGURE 4.

The side edge 32 of the board 16 is provided with a thin strip of metal overlying the same, as at 36 in FIGURES 3 and 4, forming a knife guide for severing the extruded dough pushed out of the adjacent side edges when the boards 10 and 16 are moved to the superimposed position. In FIGURE 5, a circular knife 38 is shown severing a dough strip 40 from the overhanging portion of the side edge 30 of the board 10.

In use, the boards 10 and 16 are first positioned on the supporting surface as in FIGURE 1 with adjacent side edges abutting. Next, a single sheet of dough or several sheets of dough, as at 42 in FIGURE 2, are laid upon the upper faces of the boards 10 and 16. A small quantity of the filling, as at 44, is then placed in each of the pockets 26 on top the sheet of dough which, of course, sizes, as in FIGURE 3, to form a small mound above each pocket 26.

Next, the board 10 is shifted onto the board 16, as in FIGURE 4, to bring one-half of the dough over the pockets and filling 44. The upper surfaces of the dough sheets are first moistened so that the two sheets of dough adhere when they are folded together.

Next, the assembled boards 10 and 16 are inverted as in FIGURE 5, and the knife 38 is run along the guide 36 to sever the strip 40 from the dough sheets.

Finally, the boards 16 and 10 are shifted to their side by side position, as in FIGURE 7, and the knife 38 is used to separate the pairs of formed filled pastries from each other so that each pastry looks as in FIGURE 8, and designated by the numeral 46.

What is claimed is:

Apparatus for making a filling containing pastry comprising a first rigid flat-faced board positioned so that one of the faces rests upon and is supported upon a horizontal flat supporting surface, a second rigid flat-faced board positioned so that one of its side edges abuts and extends along one of the side edges of said first board with one of the faces resting upon and supported upon said supporting surface, one of said boards having a greater transverse extent than the other, along a line normal to said abutting side edges, a plurality of spaced holes in one of said boards and extending therealong from one end to the other end of said one board, and means connecting said abutting side edges of said first and second boards together for movement of either of said boards from the side edge abutting position to a position overlying and resting upon the other board with the respective opposite side edges of said boards lying in a laterally-offset relationship so as to present a mutual marginal knife guide ledge.

References Cited in the file of this patent

UNITED STATES PATENTS

| | | |
|---|---|---|
| 110,630 | Cauhape | Jan. 3, 1871 |
| 181,306 | Blodget | Aug. 22, 1876 |
| 927,435 | Sigrist | July 6, 1909 |
| 1,688,227 | Bernier | Oct. 16, 1928 |
| 2,059,353 | Houck | Nov. 3, 1936 |
| 2,166,568 | Kuhlke | July 18, 1939 |
| 2,173,760 | Moran | Sept. 19, 1939 |

FOREIGN PATENTS

| | | |
|---|---|---|
| 327,263 | Switzerland | Mar. 15, 1958 |
| 716,043 | France | Oct. 5, 1931 |